United States Patent [19]
Papuchon et al.

[11] 4,223,977
[45] Sep. 23, 1980

[54] INTEGRATED OPTICAL DEMULTIPLEXING CIRCUIT

[75] Inventors: Michel Papuchon; Claude Puech, both of Paris, France

[73] Assignee: Thomson-CSF, Paris, France

[21] Appl. No.: 31,603

[22] Filed: Apr. 19, 1979

[30] Foreign Application Priority Data

Apr. 25, 1978 [FR] France ................... 78 12183

[51] Int. Cl.³ ............................................. G02B 5/14
[52] U.S. Cl. ................... 350/96.11; 350/96.12; 350/96.14
[58] Field of Search ............... 350/96.11, 96.12, 96.14

[56] References Cited

U.S. PATENT DOCUMENTS

| | | | |
|---|---|---|---|
| 4,067,641 | 1/1978 | Holton | 350/96.12 |
| 4,070,094 | 1/1978 | Martin | 350/96.14 |
| 4,128,300 | 12/1978 | Stotts et al. | 350/96.14 |
| 4,142,775 | 3/1979 | Ramaswamy et al. | 350/96.14 |

FOREIGN PATENT DOCUMENTS 647   2/1979   European Pat. Off. ......... 350/96.14

*Primary Examiner*—Stewart J. Levy
*Attorney, Agent, or Firm*—Cushman, Darby & Cushman

[57] ABSTRACT

The invention relates to an integrated optical circuit intended to separate a plurality of optical waves of different wavelengths, comprising at least one basic cell formed of elements integrated on the same plate: a directional coupler adjusted to divide between two output branches the incident energy in one branch of the coupler; each of the output branches comprising a phase-shifter, an engraved network which reflects an optical carrier of a definite wavelength, a second phase-shifter; and a junction between the two output branches. The phase-shifters are adjusted so that the waves reflected by the networks are in phase-opposition at the input to the coupler and recombine in the fourth branch of the coupler, and so that the waves not reflected by the networks are in phase in the junction.

7 Claims, 4 Drawing Figures

INTEGRATED OPTICAL DEMULTIPLEXING CIRCUIT

FIELD OF THE INVENTION

The invention relates to an integrated optical circuit for demultiplexing a signal consisting of multiplexed optical waves having different wavelengths, and is particularly intended for the field of optical telecommunications.

In optical telecommunications it is possible to transmit simultaneously a plurality of information signals by optical means in an optical cable, an optical wave of a definite wavelength being used for each of the signals. It is then necessary to demultiplex the signals upon reception, the waves being separated from one another.

SUMMARY OF THE INVENTION

The demultiplexing circuit according to the invention carries out such a function, and has an integrated compact structure ease of use, and having good efficiency, carriers of different wavelengths being correctly separated.

According to the invention there is provided an integrated optical demultiplexing circuit intended to receive an optical signal consisting of a plurality of optical waves of different wavelengths and to supply the various waves at separate outputs, comprising at least one basic cell comprising, integrated on the same plate a directional coupler having one input path, two output paths for radiation in the forward direction and one output path for radiation in the reverse direction, and two guides extending the two forward output paths on each of which there is a reflecting network for radiation of a definitive wavelength, the two guides converging in order to form a single output guide, the optical paths between the forward output paths and the networks being adjusted so that, the coupler having divided the incident radiation between the two forward output paths, the two halves of the radiation reflected by the networks enter the coupler in phase-opposition and recombine in order to emerge in the reverse output path.

BRIEF DESCRIPTION OF THE DRAWINGS

For a better understanding of the invention and to show how the same may be carried into effect reference will be made to the following description and the attached drawings in which.

DESCRIPTION OF THE PREFERRED EMBODIMENTS

The integrated optical demultiplexing circuit according to the invention is arranged to separate a plurality of optical waves of distinct wavelengths which been previously multiplexed to form a composite signal transmitted by way of a fiber optical channel. This channel and the optical guides which are integrated in order to form the demultiplexing circuit are preferably of the single-mode type.

The following description of a form of embodiment of the circuit will be given with reference to FIGS. 1, 2 and 3.

Figure 1:
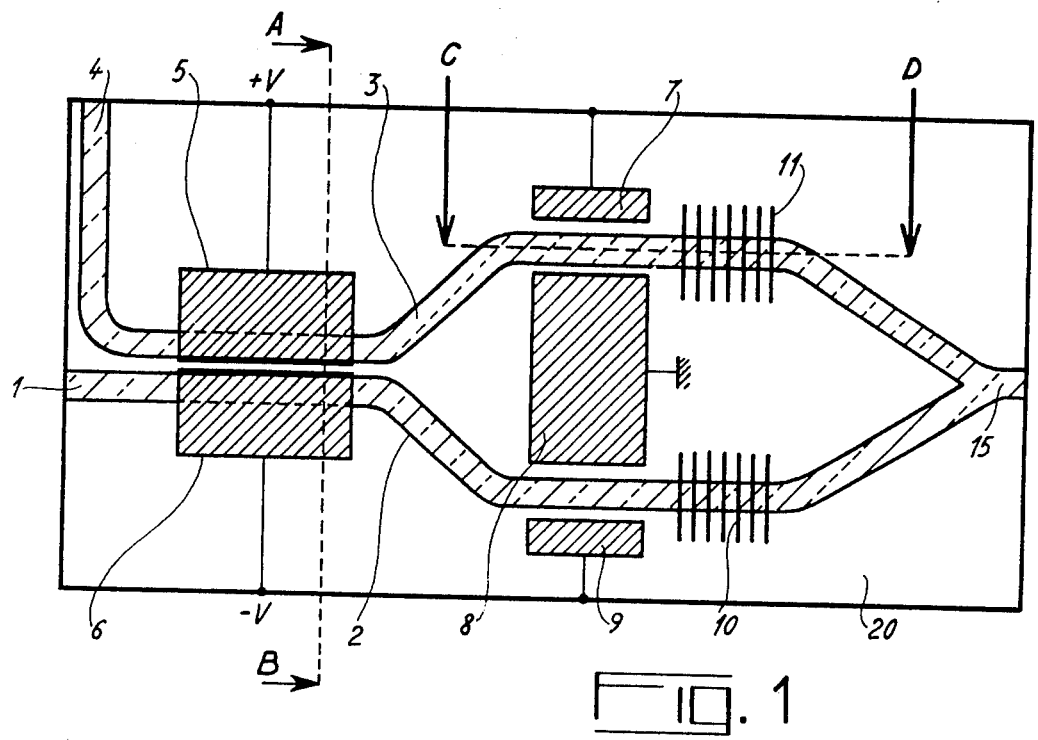
FIG. 1 illustrates an embodiment of the basic cell of the integrated optical demultiplexing circuit according to the invention.
Figure 2:
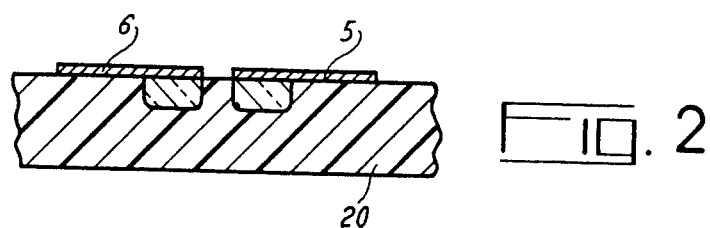
FIGS. 2 and 3 illustrate sections along AB and CD of the cell illustrated in FIG. 1.

FIG. 1 illustrates in plan an example of a basic cell of the integrated optical demultiplexing circuit. This circuit is formed on a plate 20, which may for example be a lithium niobate plate wherein the waveguides are embodied by diffusing titanium, or lithium tantalate plate wherein the waveguides are embodied by diffusing niobium. Guides in such materials exhibit low optical losses (of the order of or less than 1 dB/m), and the method of diffusing by masking into such materials is well known.

The waveguides embodied in the plate are such as to constitute successively a directional coupler, two parallel guide-branches and two converging branches which converge into a single output branch. The directional coupler, which comprises four paths 1, 2, 3 and 4, is used as a separator for the incident composite optical signal received via path 1, and as a mixer for the separated return waves, that is to say that the length L of the interaction zone in which energy is exchanged between the two guides is so chosen that the energy entering via path 1 is divided equally between paths 2 and 3. On the return the light-energy will emerge from one and/or the other of paths 1 and 4, according to the phase-shift between the waves emanating from paths 2 and 3. In particular, if the return waves entering via paths 2 and 3 are of the same amplitude and phase-shifted by $\pi$, all the return energy is recovered on path 4.

For this purpose, the coupler comprises two electrodes 5 and 6 associated with the two close and parallel guide-branches, enabling adjustment of the transverse electric field applied to the guides to impart accurate separation to 50% of the incident radiation, and the phase-shifted reflected waves to be recombined in path 4. FIG. 2 illustrates a section of the circuit, on a level with the coupler, along AB.

A phase-shifter is provided in order to put the return waves into the condition of phase-opposition. For this purpose, branches 2 and 3 of the coupler are extended by two parallel guide-branches to which an electric field is applied over a certain distance in order to cause the phase of the guided waves to vary. Electrodes 7, 8 and 9 are provided for this purpose. The central electrode 8 is taken for example to a potential of O, while the lateral electrodes 7 and 9 are taken to opposite potentials $+V$ and $-V$. Thus opposite transverse electric fields are applied to the two branches, and set up index-variations in the contrary direction which impart variations in the reverse direction to the propagation constant of the waveguides in each of the guides. After a chosen length l, the waves in the two guide-branches have followed different optical paths. The electric field is adjusted so that the path difference of the two reflected waves in the coupler is equal to $(2k+1)\lambda i/2$ ($k$ being an integer).

Two selective reflecting networks 10 and 11 are engraved on each of the branches of the guide. These networks have a pitch $\Lambda_i$ which is a function of the wavelength of the waves to be reflected, $\lambda_i$, the lines of the networks orthogonal to the guides being spaced by $\Lambda_i = \lambda i/2n$ where n is the index of the guide. Such networks may be engraved by ion-machining through a photo-sensitive resin mask; the lines on the mask may be made for example by holography. FIG. 3 illustrates a section of the circuit, on a level with a network, along CD. It is possible to embody networks whereof the selectivity is of the order of 3 Å. Provided that the optical waves forming the composite optical signal are not too close in wavelength (the difference between their wavelengths not being less than 10 Å for example), the networks will selectively reflect the wave of the chosen wavelength and transmit the others without affecting them. Upon returning, the waves reflected by each of the networks follow optical paths differing by $(2k+1)\lambda i/2$, so that the waves having a length of $\lambda_i$ are phase-shifted by $\pi$ upon entering paths 2 and 3, and combine in order to emerge via path 4 of the coupler.

The other optical waves are transmitted by the networks. A second phase-shifter, similar to the first but setting up reverse phase-variations can be provided between the network and the output branch. This second phase-shifter enabling the two parts of the transmitted waves to be put back into phase in order that propagation in the single output guide 15 may be carried out under good conditions.

The electrodes of the various active elements are produced by evaporating metal, gold or aluminium for example, and masking.

The elements described above constitute the basic cell of the demultiplexing circuit according to the invention. It is possible for (n−1) cells such as those described to be integrated on the same plate in order to demultiplex n optical waves of distinct wavelengths.

Figure 3:
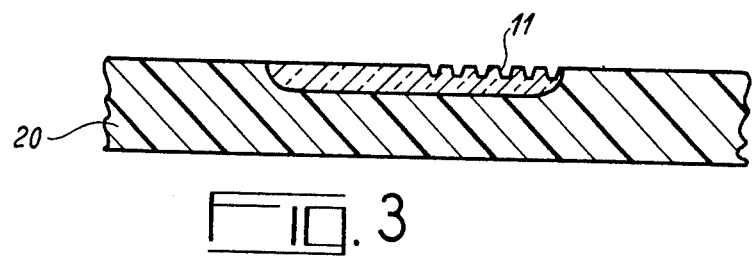
Figure 4:
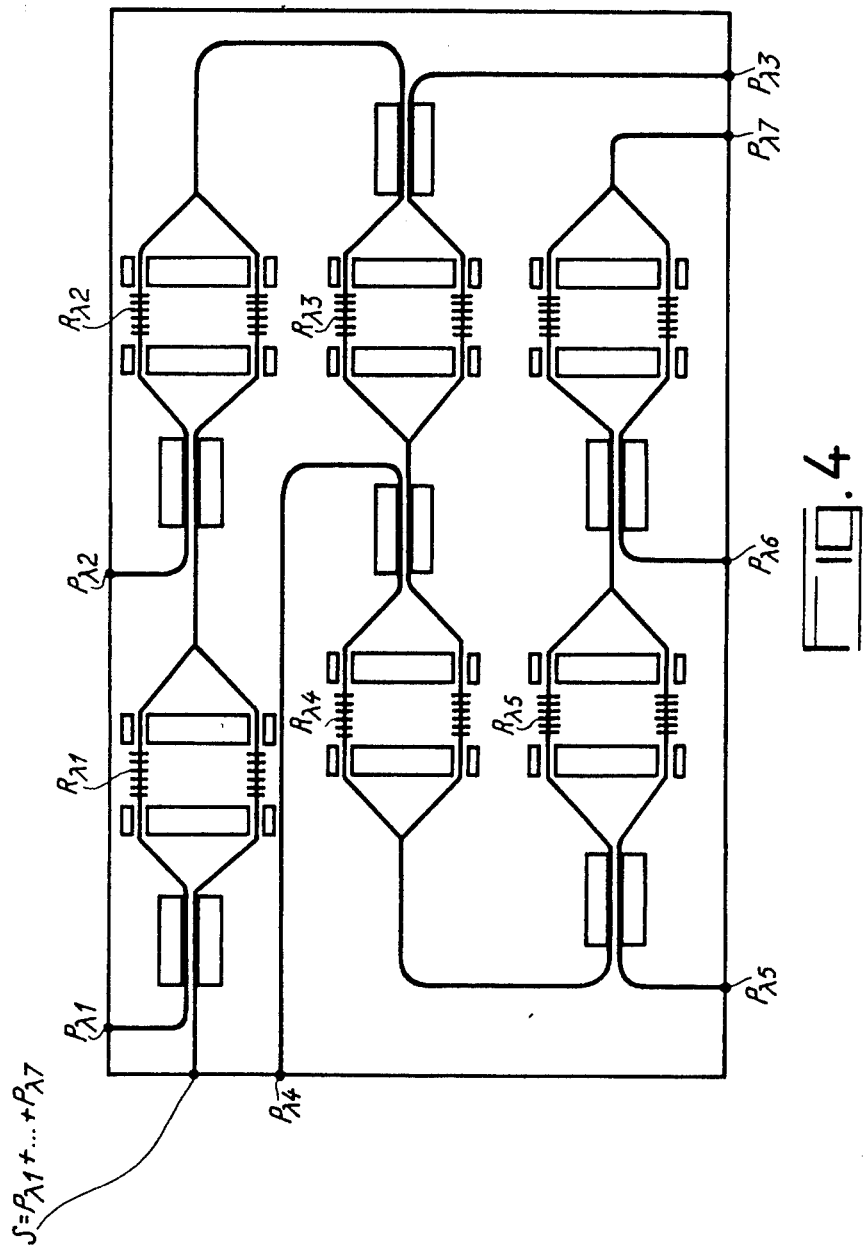
FIG. 4 illustrates an example of a circuit comprising a plurality of basic cells for demultiplexing a composite optical signal.

FIG. 3 illustrates an example of a circuit having 6 basic cells for demultiplexing 7 optical carrier waves $P\lambda_1 \ldots P\lambda_7$ of distinct wavelengths $\lambda_1 \ldots \lambda_7$. This embodiment is given by way of non-limitative example. The dimensions of a basic cell being of the order of a centimeter, the number of waves capable of being demultiplexed is a function of the length of the guides capable of being integrated on the support; integration may be carried out along a median line in the form of a coil as illustrated diagrammatically in FIG. 3, wherein 6 consecutive demultiplexing cells are illustrated. Each wave is reflected by the networks $R\lambda_i (i=1, \ldots 7)$. The supply leads to the electrodes are not illustrated in this drawing.

In such circuits the radiation is guided in single-mode guides. For materials such as $LiNbO_3$ or $LiTaO_3$, the guides have quasi-rectangular cross-sections of about 2 μm wide and 1 μm thick. It is also possible to make micro light-guides in other materials, for example in a resin of suitable index, for example a resin such as PMMA (polymethyl methacrylate) deposited on a support of silica, the refractive index being variable under the action of light-radiation. The optical guides and the networks may be made in such materials by masking and direct exposure to radiation of appropriate wavelength. The phase-shifts to be introduced into the two output paths of the coupler are produced by additional index variation on definite lengths of the guides.

The invention is not limited to the form of embodiment of the invention specifically described. In particular, it is possible to use a semiconductive support such as GaAs or InP, wherein the waveguides are made by doping or formation of ternary or quaternary alloys.

Such supports are suitable for transmitting optical waves having wavelengths in the infra-red region, for example 1.15 μm for GaAs, and have losses slightly greater than those measured in guides formed on supports such as $LiNbO_3$ or $LiTaO_3$. These materials being electro-optical, the necessary index variations may be obtained by applying an electric field to the guide. In addition, it is possible to form detecting junctions in such supports in order to recover at each output the separated optical carriers.

In addition, the directional coupler of the COBRA (rapid binary optical coupler) type illustrated in the drawings may be replaced by a coupler having four single-mode arms linked by a multiple-mode branch.

Finally, in order to impart the condition of phase-opposition to the waves reflected by the networks at the input to the coupler, phase-shifters using the double-refraction effect induced by an electric field have been previously described; this arrangement is not limitative, and it is possible to impart the phase-opposition to the reflected waves at the input to the coupler, for example by embodying optical paths of different lengths between the outputs of the couplers and the networks by having different guide lengths.

The device described above may be improved by the addition of a means of adjusting the frequency reflected by the network. For this purpose, two electrodes are disposed on one each side of the waveguide on a level with each reflecting network. A voltage may be applied between these two electrodes in order to modify the index of the guide by an electro-optical effect. Such an arrangement enables the frequency $\lambda i = 2n\Lambda_i$ to be adjusted when the pitch $\Lambda_i$ has been fixed, in an interval of 3 to 4 Å, so as to overcome faults occurring for example during manufacture in determining the pitch of the network.

What we claim is:

1. Integrated optical demultiplexing circuit intended to receive an optical signal consisting of a plurality of optical waves of different wavelengths and to supply the various waves at separate outputs, comprising at least one basic cell comprising, integrated on the same plate, a directional coupler having one input path, two output paths for radiation in the forward direction and one output path for radiation in the reverse direction, and two guides extending the two forward output paths on each of which there is a reflecting network for radiation of a definite wavelength, the two guides converging in order to form a single output guide, the optical paths between the forward output paths and the networks being adjusted so that, the coupler having divided the incident radiation between the two forward output paths, the two halves of the radiation reflected by the networks enter the coupler in phase-opposition and recombine in order to emerge in the reverse output path.

2. Optical circuit according to claim 1, wherein the optical paths are adjusted by means of at least one phase-shifter provided on at least one of the guides extending the two forward output paths, between the corresponding output of the coupler and the network.

3. Optical circuit according to claim 2, wherein a phase-shifter is provided on each of the guides extending the two forward output paths of the coupler between the outputs and the corresponding networks, the variations of the optical paths being opposite.

4. Optical circuit according to claim 3, wherein a second phase-shifter is provided respectively on each of the guides between the networks and the single output guide, the phase-shifts introduced being adjusted so that the radiation not reflected by the networks is coupled into the output guide with maximum efficiency.

5. Optical circuit according to claim 4, wherein the plate on which the circuit is formed is a material of the type exhibiting electrical double refraction, LiNbO₃ or LiTaO₃, wherein the waveguides are embodied by metal-diffusion, the coupler and the optical paths being adjusted electrically.

6. Optical circuit according to claim 5, wherein the networks are engraved by ion-machining through a resin mask, a network having a pitch determined as a function of the wavelength of the carrier to be extracted from the signal being previously formed on said mask.

7. Optical circuit according to claim 1, wherein in order to demultiplex n optical waves having wavelengths of $\lambda_1 \ldots \lambda_n$, the circuit comprises at least $(n-1)$ successive basic cells, each comprising networks having a pitch of $\lambda i/2n$, where $n$ is the index of the guide and $\lambda i$ is the wavelength of the wave to be selected by the corresponding cell.

* * * * *